(12) United States Patent
Duan et al.

(10) Patent No.: US 12,198,010 B2
(45) Date of Patent: Jan. 14, 2025

(54) ADDRESSING MANIPULATION SYSTEM AND ADDRESSING MANIPULATION METHOD

(71) Applicant: Tsinghua University, Beijing (CN)

(72) Inventors: Luming Duan, Beijing (CN);
Haoxiang Yang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 573 days.

(21) Appl. No.: 17/646,882

(22) Filed: Jan. 4, 2022

(65) Prior Publication Data
US 2022/0222566 A1    Jul. 14, 2022

(30) Foreign Application Priority Data

Jan. 14, 2021 (CN) .......................... 202110047218.2

(51) Int. Cl.
*G06N 10/40* (2022.01)
*G06N 10/00* (2022.01)

(52) U.S. Cl.
CPC ............. *G06N 10/40* (2022.01); *G06N 10/00* (2019.01)

(58) Field of Classification Search
CPC ................................. G06N 10/40; G06N 10/00
See application file for complete search history.

(56) References Cited

U.S. PATENT DOCUMENTS

| | | | |
|---|---|---|---|
| 9,915,851 B1 * | 3/2018 | Wasilousky | G02F 1/332 |
| 9,958,710 B1 * | 5/2018 | Morse | G02F 1/11 |
| 11,488,052 B1 * | 11/2022 | Saffman | G06N 10/20 |
| 2018/0120599 A1 * | 5/2018 | Morse | G02F 1/113 |
| 2019/0205784 A1 | 7/2019 | Monroe et al. | |

(Continued)

FOREIGN PATENT DOCUMENTS

| | | |
|---|---|---|
| CN | 1265746 A | 9/2000 |
| CN | 109948802 A | 6/2019 |
| CN | 109961149 A | 7/2019 |

(Continued)

OTHER PUBLICATIONS

Notification to Grant Patent Right for Invention, CN Application No. 202110047218.2, Sep. 23, 2022.

*Primary Examiner* — Stacy Whitmore
(74) *Attorney, Agent, or Firm* — Thomas | Horstemeyer, LLP

(57) ABSTRACT

The present disclosure discloses an addressing manipulation system and an addressing manipulation method. The addressing manipulation system includes a control unit, a radio frequency driving unit and two addressing units. The control unit controls a frequency and polarization of an incident laser beam in real time, so that the incident laser beams meet the Raman transition condition. The radio frequency driving unit controls the number and frequencies of radio frequency driving fields applied to each addressing unit, and achieves the control of the number and angles of the emergent laser beams and a frequency difference of the emergent laser beam pair. The addressing unit receives and modulates the incident laser beam and outputs a preset number of the emergent laser beams for addressing manipulation, wherein the emergent laser beam is one laser beam of the emergent laser beam pair for addressing manipulation.

20 Claims, 8 Drawing Sheets

(56) References Cited

U.S. PATENT DOCUMENTS

2020/0301241 A1    9/2020  Duan et al.
2023/0282385 A1*   9/2023  Kim ..................... G21K 1/006
                                                           250/251

FOREIGN PATENT DOCUMENTS

CN      111902358 A    11/2020
WO      2020/018797 A1  1/2020

* cited by examiner

ADDRESSING MANIPULATION SYSTEM AND ADDRESSING MANIPULATION METHOD

CROSS-REFERENCE TO RELATED APPLICATION

The present application claims priority to Chinese Patent Application No. 202110047218.2 filed to the CNIPA on Jan. 14, 2021, the content of which is incorporated herein by reference.

TECHNICAL FIELD

The present disclosure relates to, but is not limited to, the technical field of quantum computers, in particular to an addressing manipulation system and an addressing manipulation method.

BACKGROUND

A quantum computer is a device that uses quantum logic gates for general quantum computation. A basic logic unit of the quantum computer is composed of qubits complying principles of quantum mechanics, and the quantum computer can be constructed using a large number of interacting qubits which can be manipulated coherently. Compared with a classical computer, the quantum computer provides a significant speed-up when solving some specific problems. Therefore, the quantum computer has a wide application prospect in basic scientific research, quantum communication and cryptography, artificial intelligence, financial market simulation, climate change prediction and so on in the future, and has attracted remarkable attention.

Using a trapped ion (or atom) qubit array, various quantum logic gates with high fidelity can be achieved under existing experimental conditions. Ion qubits are excellent in key indicators for measuring the performance of quantum computation, such as interaction controllability, long coherence time, high-fidelity quantum logic gates and quantum error correction, and are one of the platforms that are most likely to realize the quantum computer. Basic logic gates on ion (or atom) qubits are mainly achieved by laser beams or microwaves. How to achieve an addressing manipulation system for ion (or atom) qubits is one of the core issues in achieving the quantum computer. It has an important influence on complexity of the whole quantum computer system, the speed and fidelity of quantum logic gates, the flexibility of quantum algorithm design, and the physical resources required by the whole system. With the number of qubits increasing, the performance requirements of the addressing manipulation system will be greatly enhanced. The addressing manipulation system with high quality is the key technology to achieve a scalable trapped-ion quantum computer.

The core of addressing manipulation is to selectively control the state of any number of qubits in time and space. Basic requirement of the addressing manipulation includes having single qubit spatial resolution, being able to control qubit state (mainly referring to transitions between different energy levels), and being able to control positions and the number of addressed qubits in real time. It is also required that the time of addressing switching (between different addressed qubits) is short enough in order to ensure the efficiency of the quantum computation.

At present, there are three common addressing methods of ion (or atom) qubits. FIG. 1 is a schematic diagram of addressing manipulation of ion qubits in the related art. As shown in FIG. 1, addressing manipulation of qubits is performed through a multi-channel acousto-optic modulator (AOM); the laser beams incident on each channel will be frequency-shifted, and the first-order diffraction beams are delivered to corresponding ions by an optical system, addressing manipulation of a single ion (or atom) qubit corresponds to timing control of a single channel in the AOM; wherein, each addressing channel needs an independent electronic control system. With the qubit number increasing, the number of AOM channels and the electronic control systems increase linearly, which makes the addressing manipulation system quite complex, and will greatly reduce the robustness of the whole system. FIG. 2 is a schematic diagram of another addressing manipulation of ion qubits in the related art. As shown in FIG. 2, three microwave (MW) electrodes are integrated on a microfabricated surface ion trap, and a radial gradient magnetic field is generated in the trap region using these microwave electrodes. Zeeman splitting varies with the strength of the magnetic field, thus ions at different radial positions experience different Zeeman splitting. Adjusting the microwave frequency through the microwave electrodes may achieve addressing and quantum manipulation of ions at different radial positions. In order to generate a large magnetic field gradient, the distance between an ion and the microwave electrode is quite small (about 30 microns), therefore, this solution is only suitable for a specially designed surface ion trap. Since the ion is very close to the electrode of the chip, stray electric field noise on the chip surface will greatly reduce the coherence time of qubits, meanwhile, it is necessary to change the electric field to make the ion deviate from the trap axis during an addressing process, so micromotion will be introduced, which will reduce the fidelity of coherent quantum operation. FIG. 3 is a schematic diagram of a one-dimensional addressing manipulation system in the related art. As shown in FIG. 3, a one-dimensional qubit addressing manipulation is achieved by a first acousto-optic deflector (AOD) and a second AOD, which are perpendicular to each other. The frequency and deflection angle of an incident laser beam will be modulated by an AOD via Bragg diffraction. Adjusting of the orientation of the AOD crystal may make the output laser beam power distribute mainly in a (positive or negative) first-order diffraction spot. Diffracted light is deflected in a plane spanned by the direction of the incident light and the direction of the wave vector of the radio frequency driving field, and a deflection angle is determined by the frequency of the radio frequency driving field applied to the AOD. Radio frequency driving fields with the same frequency are applied to the first AOD and the second AOD, but diffraction spots with opposite orders are chosen, which may achieve one-dimensional addressing. For example, after the laser beam passes through the first AOD, positive first-order diffracted light is generated, and the light is deflected by a wave vector $\vec{k}_1$ of the radio frequency driving field, and the frequency increases by f. Then negative first-order diffracted light is generated through the second AOD, and the emergent direction is deflected by a negative wave vector $-\vec{k}_2$ of the radio frequency driving field, and the frequency is reduced by f. Therefore, after passing through the one-dimensional addressing unit, the emergent laser beam is deflected along a direction of $\vec{k}_1 - \vec{k}_2$, and the deflection angle is determined by the frequency f of the radio frequency driving field, but the frequency of the laser beam does not change. FIG. 4 is a schematic diagram of one-dimensional addressing in the related art. As shown in FIG. 4, referring to the one-dimensional addressing unit shown in FIG. 3, one-dimensional addressing along the $\vec{K}_1-\vec{K}_2$ direction can be achieved. For the convenience of the following description, a direction in which the frequency of the laser beam does not change after the laser beam passes through the one-dimensional addressing unit is defined as an equal-frequency line (EFL) of the one-dimensional addressing unit. FIG. 5 is a schematic diagram of a two-dimensional addressing manipulation system in the related art. As shown in FIG. 5, in the solution of achieving two-dimensional addressing by using two addressing units shown in FIG. 3, the frequencies of the radio frequency driving fields applied to the two addressing units are the same, and the EFL of the two addressing units are perpendicular to each other. The laser beam passes through two addressing units sequentially, so that the two-dimensional addressing manipulation in a plane where the two EFL lines are located can be achieved. FIG. 6 is a schematic diagram of two-dimensional addressing in the related art. As shown in FIG. 6, referring to the two-dimensional addressing unit shown in FIG. 5, two-dimensional addressing can be achieved.

To sum up, for the two kinds of ion (or atom) qubits addressing manipulation methods shown in FIG. 1 and FIG. 2, with the increase in the number of qubits, the complexity of optical or microwave system design, control electronic system design and logic control program required to achieve the above addressing system will rapidly increase, which restricts the achievement of large-scale quantum computers. Although the above-mentioned addressing solution using AODs reduces the complexity of the system and eliminates the dependence on specific devices and specially designed physical systems, it is still unable to perform efficient three-dimensional addressing. At present, the bottleneck of large-scale quantum computation is mainly the lack of scalability. Building a three-dimensional qubit array is one of the efficient ways to extend the number of qubits. Designing of an efficient three-dimensional addressing manipulation system is a problem to be solved to achieve large-scale quantum computation.

SUMMARY

The following is a summary of subject matter described in detail herein. This summary is not intended to limit the protection scope of the claims.

An embodiment of the present disclosure provides an addressing manipulation system and an addressing manipulation method, which can achieve addressing manipulation for multi-dimensional qubit array.

An embodiment of the present disclosure provides an addressing manipulation system, including: two addressing units placed on two different sides of the qubits on which the addressing manipulation will be performed, a radio frequency driving unit and a control unit.

Each of the two addressing units is configured to receive an incident laser beam; modulate the incident laser beam according to a radio frequency driving field applied to the addressing unit, and output a preset number of emergent laser beams for addressing manipulation; wherein, the corresponding emergent laser beams from the two addressing units form emergent laser beam pairs for addressing manipulation and each emergent laser beam pair for addressing manipulation is directed to one qubit on which the addressing manipulation will be performed.

The radio frequency driving unit is configured to control a number of radio frequency driving fields applied to each of the addressing units; control an emergent angle of the emergent laser beam by controlling a frequency of each applied radio frequency driving field, and control a frequency difference of the emergent laser beam pair for addressing manipulation, so that the frequency difference of the emergent laser beam pair for addressing manipulation keeps unchanged during the addressing manipulation.

The control unit is configured to control a frequency and polarization of the incident laser beam incident on each of the addressing units in real time, so that the incident laser beams incident on the two addressing units meet the Raman transition condition on the qubit on which the addressing manipulation will be performed and each emergent laser beam pair for addressing manipulation from the two addressing units meet the Raman transition condition on the qubit on which the addressing manipulation will be performed.

In an exemplary embodiment, the control unit is further configured to control an incident direction of the incident laser beam incident on each of the addressing units.

In an exemplary embodiment, the addressing unit includes one or more acousto-optic devices.

In an exemplary embodiment, that the radio frequency driving unit is configured to control the number of the radio frequency driving fields applied to each of the addressing units includes: the radio frequency driving unit is configured to control the number of radio frequency driving fields applied to each acousto-optic device according to the preset number and a number and position distribution of the acousto-optic devices included in each of the addressing units.

In an exemplary embodiment, that the radio frequency driving unit is configured to control the frequency of each radio frequency driving field includes: the radio frequency driving unit is configured to control the frequency of each applied radio frequency driving field according to predetermined spatial distribution of qubits on which the addressing manipulation will be performed and a number and position distribution of the acousto-optic devices included in the addressing unit.

In an exemplary embodiment, the addressing unit further includes a focusing module, which is configured to: focus each of the output emergent laser beam for addressing manipulation to a spot size only covering one qubit.

In an exemplary embodiment, the addressing manipulation system is used for addressing manipulation of a two-dimensional qubit array.

In an exemplary embodiment, the two addressing units are placed with mirror symmetry about a plane of the qubit array.

In an exemplary embodiment, the addressing manipulation system is used for addressing manipulation of a three-dimensional qubit array.

In an exemplary embodiment, the two addressing units are placed with 90-degree rotational symmetry about a reference axis of the three-dimensional qubit array.

In another aspect, an embodiment of the present disclosure also provides an addressing manipulation method, including: determining a frequency and polarization of incident laser beam incident on each of two addressing units; wherein the two addressing units are placed on two different sides of the qubits on which the addressing manipulation will be performed; making the incident laser beams with the determined frequencies and polarizations be incident on the two addressing units respectively; controlling the two addressing units to output a preset number of emergent laser beam pairs for addressing manipulation by controlling a number of radio frequency driving fields applied to each of the two addressing units; wherein each emergent laser beam pair for addressing manipulation is directed to one qubit on which the addressing manipulation will be performed; and controlling an emergent angle and frequency of the emergent laser beam by controlling a frequency of each radio frequency driving field, and outputting the emergent laser beam for addressing manipulation; wherein the incident laser beams incident on the two addressing units meet the Raman transition condition on the qubit on which the addressing manipulation will be performed; each emergent laser beam pair for addressing manipulation from the two addressing units meet the Raman transition condition on the qubit on which the addressing manipulation will be performed; and a frequency difference of each emergent laser beam pair for addressing manipulation keeps unchanged during the addressing manipulation.

In an exemplary embodiment, the addressing unit includes one or more acousto-optic devices.

In an exemplary embodiment, the controlling the number of radio frequency driving fields applied to each of the two addressing units includes: controlling the number of radio frequency driving fields applied to each acousto-optic device according to the preset number and a number and position distribution of the acousto-optic devices included in each of the two addressing units.

In an exemplary embodiment, the controlling the frequency of each radio frequency driving field includes: determining a frequency of each applied radio frequency driving field according to predetermined spatial distribution of qubits on which the addressing manipulation will be performed and a number and position distribution of the acousto-optic devices included in the addressing unit; and the outputting the emergent laser beam for addressing manipulation includes: applying each radio frequency driving field with the determined frequency to a corresponding acousto-optic device to obtain the emergent laser beam for addressing manipulation.

In an exemplary embodiment, the addressing manipulation method further includes: focusing each of the emergent laser beam for addressing manipulation to a spot size only covering one qubit.

In an exemplary embodiment, the addressing manipulation method is used for addressing manipulation of a two-dimensional qubit array.

In an exemplary embodiment, the two addressing units are placed with mirror symmetry about a plane of the qubit array.

In an exemplary embodiment, the addressing manipulation method is used for addressing manipulation of a three-dimensional qubit array.

In an exemplary embodiment, the two addressing units are placed with 90-degree rotational symmetry about a reference axis of the three-dimensional qubit array.

The addressing manipulation system according to the embodiment of the present disclosure includes the control unit, the radio frequency driving unit and two addressing units. The control unit controls the frequency and the polarization of the incident laser beam in real time, so that the incident laser beams meet the Raman transition condition. The radio frequency driving unit controls the number and the frequency of the radio frequency driving fields applied to each addressing unit, and achieves the control of the number and the angles of the emergent laser beams and the frequency difference of the emergent laser beam pair.

The addressing unit receives and modulates the incident laser beam and outputs a preset number of emergent laser beams for addressing manipulation, wherein the emergent laser beam is one laser beam of the emergent laser beam pair for addressing manipulation. In the embodiment of the present disclosure, the incident laser beams are controlled to meet the Raman transition condition, and the frequency difference of the emergent laser beam pair keeps unchanged during the addressing manipulation, which is helpful to achieve the quantum logic gate with high fidelity. The multi-dimensional addressing manipulation is achieved through the emergent laser beam pairs, which provides technical support for large-scale quantum computation.

Other features and advantages of the present disclosure will be described in the following specification, and partly become obvious from the specification, or may be understood by implementing the present disclosure. The objects and other advantages of the present disclosure can be achieved and obtained by the structures specifically pointed out in the specification, claims and drawings.

BRIEF DESCRIPTION OF DRAWINGS

The accompanying drawings are used to provide an understanding of solutions of the present disclosure, form a part of the specification, and explain technical solutions of the present disclosure together with embodiments of the present disclosure, and do not constitute a limitation on the technical solutions of the present disclosure.

DETAILED DESCRIPTION

In order to make the objects, technical solutions, and advantages of the present disclosure clearer, the embodiments of the present disclosure will be described in detail below with reference to the accompanying drawings. It should be noted that the embodiments in the present disclosure and the features in the embodiments may be combined with each other arbitrarily if there is no conflict.

The acts shown in the flowcharts of the drawings may be executed in a computer system such as a set of computer-executable instructions. And, although a logical sequence is shown in the flowchart, in some cases, the acts shown or described may be performed in a different order from here.

Figure 1:
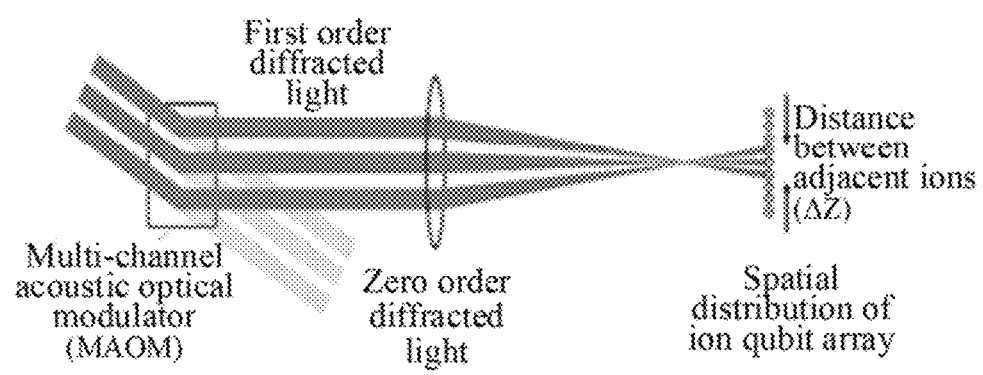
FIG. 1 is a schematic diagram of addressing manipulation of ion qubits in the related art.
Figure 2:
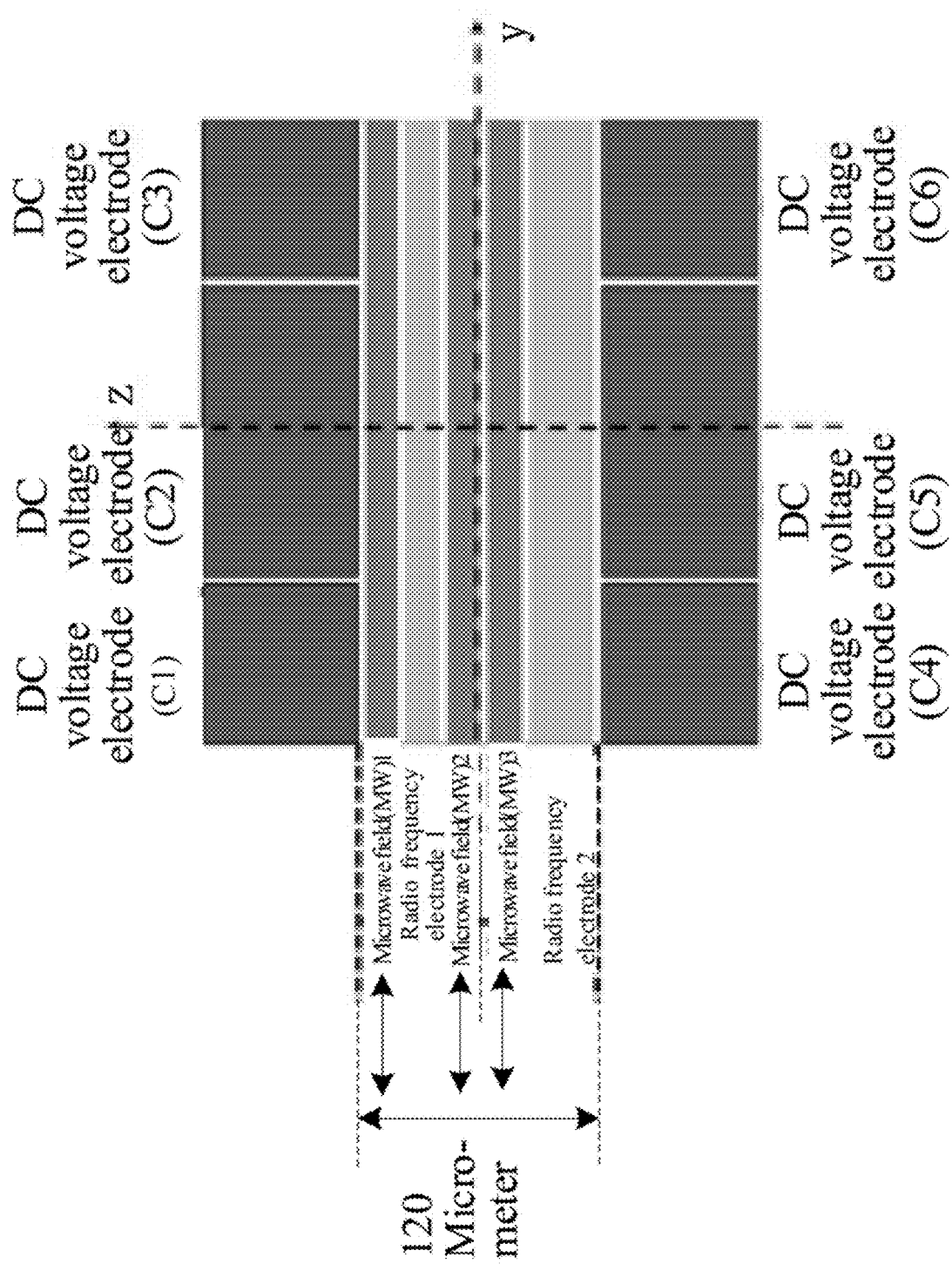
FIG. 2 is a schematic diagram of another addressing manipulation of ion qubits in the related art.
Figure 3:
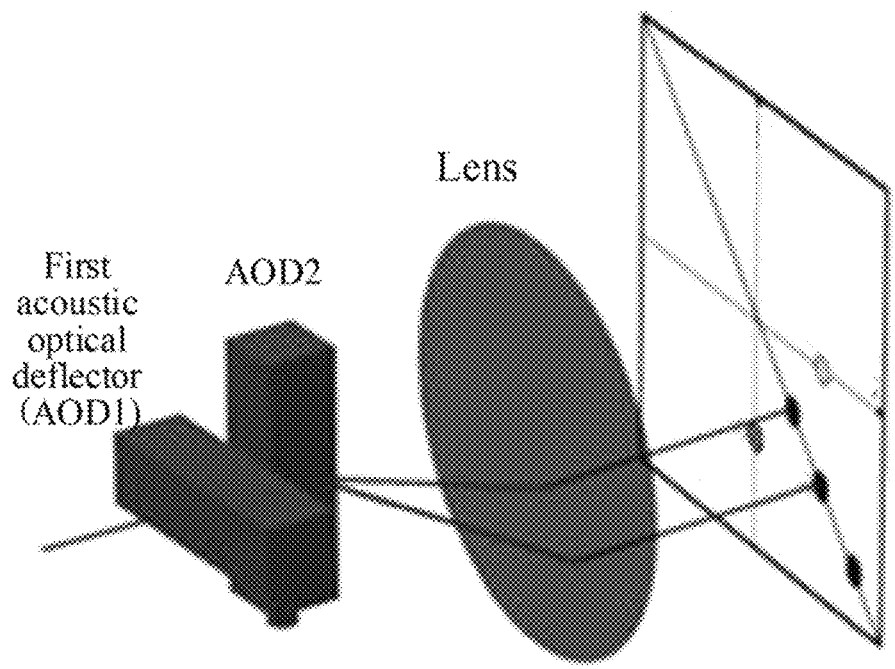
FIG. 3 is a schematic diagram of a one-dimensional addressing manipulation system in the related art.
Figure 4:
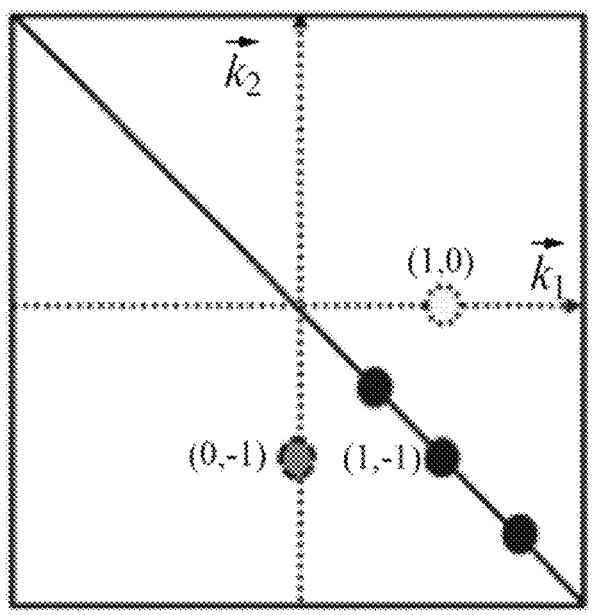
FIG. 4 is a schematic diagram of one-dimensional addressing in the related art.
Figure 5:
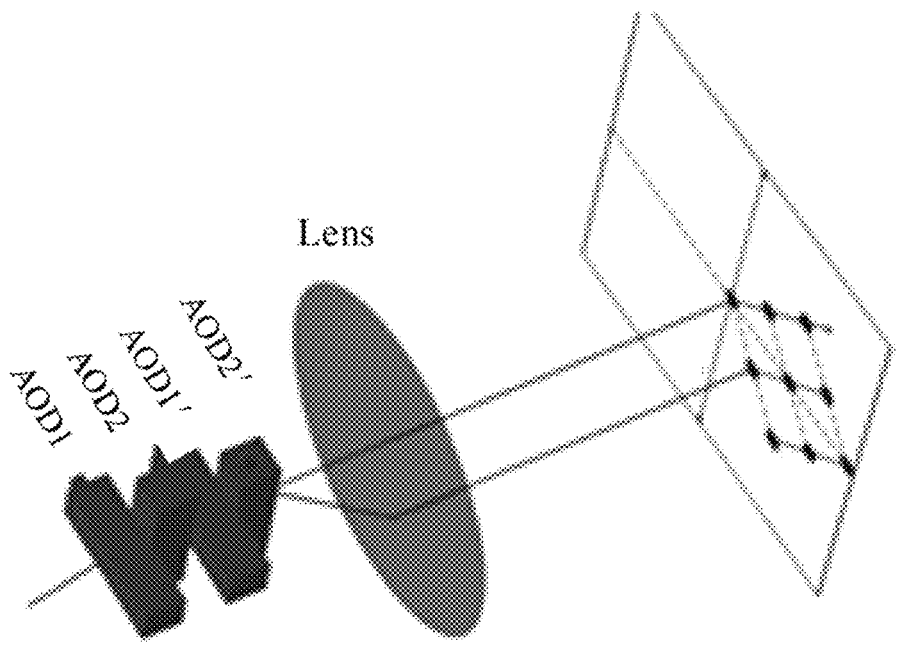
FIG. 5 is a schematic diagram of a two-dimensional addressing manipulation system in the related art.
Figure 6:
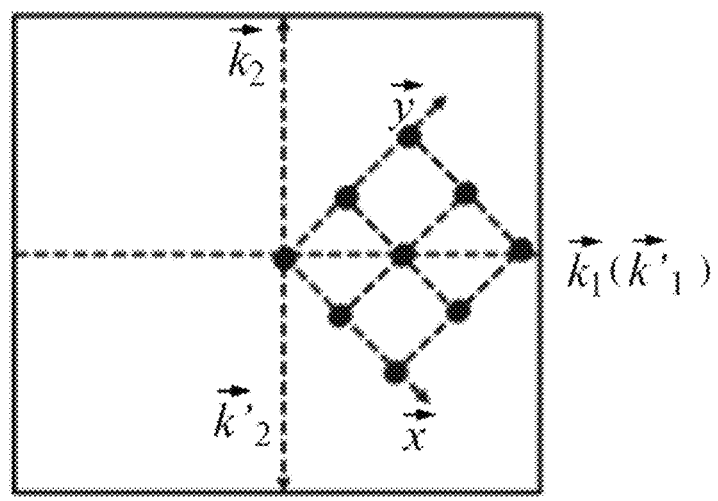
FIG. 6 is a schematic diagram of two-dimensional addressing in the related art.
Figure 7:
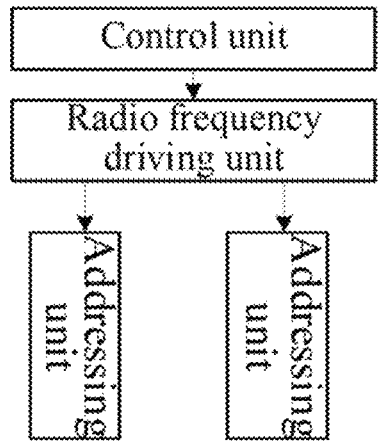
FIG. 7 is a block diagram of a structure of an addressing manipulation system according to an embodiment of the present disclosure.

FIG. 7 is a block diagram of a structure of an addressing manipulation system according to an embodiment of the present disclosure. As shown in FIG. 7, the addressing manipulation system includes two addressing units placed on two different sides of the qubits on which the addressing manipulation will be performed, a radio frequency driving unit and a control unit.

Each of the two addressing units is configured to receive an incident laser beam; modulate the incident laser beam according to a radio frequency driving field applied to itself, and output a preset number of emergent laser beams for addressing manipulation. The corresponding emergent laser beams from the two addressing units form emergent laser beam pairs for addressing manipulation and each emergent laser beam pair for addressing manipulation is directed to one qubit on which the addressing manipulation will be performed. In a process of addressing manipulation, when the addressing manipulation on a qubit is performed, each addressing unit outputs one laser beam of the emergent laser beam pair for addressing manipulation. In other words, when the addressing manipulation on a qubit is performed, the emergent laser beam pair for addressing manipulation intersect at the qubit, and the emergent laser beam pair for addressing manipulation includes two laser beams each from one addressing unit.

The radio frequency driving unit is configured to control the number of radio frequency driving fields applied to each addressing unit; control an emergent angle of the emergent laser beam by controlling a frequency of each applied radio frequency driving field, and control a frequency difference of the emergent laser beam pair for addressing manipulation, so that the frequency difference of the emergent laser beam pair for addressing manipulation keeps unchanged during the addressing manipulation.

The control unit is configured to control a frequency and polarization of the incident laser beam incident on each addressing unit in real time, so that the incident laser beams incident on the two addressing units meet the Raman transition condition on the qubit on which the addressing manipulation will be performed and each emergent laser beam pair for addressing manipulation from the two addressing units meet the Raman transition condition on the qubit on which the addressing manipulation will be performed. As for meeting the Raman transition condition, in an exemplary example in the embodiment of the present disclosure, there is generally one laser beam incident on one addressing unit, and two incident laser beams of two addressing units of the addressing manipulation system meet the Raman transition condition.

It should be noted that the addressing manipulation system according to the embodiment of the present disclosure may include multiple groups of addressing units, and one group of addressing units includes the above two addressing units in the embodiment of the present disclosure. An addressing unit in one group may form a new group of addressing units with an addressing unit in another group. For example, assumed that the first group of addressing units contains an addressing unit 1 and an addressing unit 2, and the second group of addressing units contains an addressing unit 3 and an addressing unit 4, then the addressing unit 1 and the addressing unit 3 or the addressing unit 4 may form a new group of addressing units. A process of addressing manipulation for a group of addressing units is consistent with the process of addressing manipulation for the above two addressing units in the embodiment of the present disclosure, and will not be repeated here. Multiple groups addressing units may synchronize with each other in time according to synchronization requirements of the addressing manipulation in the process of addressing manipulation.

In addition, in the embodiment of the present disclosure, when the incident laser beams are controlled to meet the Raman transition condition, and the frequency difference of the emergent laser beam pair keeps unchanged during the addressing manipulation, the emergent laser beam pair for addressing manipulation will also meet the Raman transition condition.

In an exemplary example, qubits of embodiments of the present disclosure include, but are not limited to, atomic qubits and/or ionic qubits.

In an exemplary example, the control unit of the embodiment of the present disclosure is further configured to control an incident direction of the incident laser beam incident on each addressing unit.

In an exemplary example, the addressing unit of the embodiment of the present disclosure includes one or more acousto-optic devices. In an exemplary example, the acousto-optic device of the embodiment of the present disclosure includes: a device for laser beam angle deflection. In an exemplary example, the acousto-optic device of the embodiment of the present disclosure includes an acousto-optic deflector (AOD) or an acousto-optic modulator (AOM).

In an exemplary example, that the radio frequency driving unit of the embodiment of the present disclosure is configured to control the number of radio frequency driving fields applied to each addressing unit includes the radio frequency driving unit is configured to control the number of radio frequency driving fields applied to each acousto-optic device according to the preset number and a number and position distribution of the acousto-optic devices contained in the each addressing unit.

It should be noted that in the embodiment of the present disclosure, the number of radio frequency driving fields applied to each acousto-optic device may be determined by means of optical simulation after the preset number and the number and position distribution of the acousto-optic devices contained in the each addressing unit are determined.

In an exemplary example, that the radio frequency driving unit of the embodiment of the present disclosure is configured to control the frequency of each radio frequency driving field includes the radio frequency driving unit is configured to control the frequency of each applied radio frequency driving field according to predetermined spatial distribution of qubits on which the addressing manipulation will be performed and a number and position distribution of the acousto-optic devices contained in the addressing unit.

It should be noted that in the embodiment of the present disclosure, the frequency of each applied radio frequency driving field may be determined by means of optical simulation after the spatial distribution of qubits on which the addressing manipulation will be performed and the number and position distribution of the acousto-optic devices contained in the each addressing unit are determined.

According to the embodiment of the present disclosure, the incident direction of the incident laser beam, spatial positions of the acousto-optic devices and a spatial configuration of the acousto-optic devices need to cooperate with each other, so that an emergent laser beam pair only intersects at one atomic qubit, and the frequency difference of two laser beams in the laser beam pair for addressing keeps unchanged during spatially scanning the intersection point of the laser beam pair.

In an exemplary example, the addressing unit of the embodiment of the present disclosure further includes a focusing module, which is configured to focus each emergent laser beam for addressing manipulation to a spot sire only covering one qubit.

In the embodiment of the present disclosure a spatial resolution of a single qubit is achieved through the focusing module.

In an exemplary example, in the embodiment of the present disclosure, in order to achieve the addressing manipulation of qubits, the emergent laser beams from the same addressing unit propagate in parallel with each other according to relevant principles.

In an exemplary embodiment, the addressing manipulation system is used for addressing manipulation of a two-dimensional qubit array.

In an exemplary embodiment, the two addressing units are placed with mirror symmetry about a plane of the qubit array.

In an exemplary embodiment, the addressing manipulation system is used for addressing manipulation of a three-dimensional qubit array.

In an exemplary embodiment, the two addressing units are placed with 90-degree rotational symmetry about a reference axis of the three-dimensional qubit array.

The addressing manipulation system of the embodiment of the present disclosure includes a control unit, a radio frequency driving unit and two addressing units. The control unit controls the frequency and the polarization of the incident laser beams in real time, so that the incident laser beams meet the Raman transition condition. The radio frequency driving unit controls the number and the frequency of the radio frequency driving fields applied to each addressing unit, and achieves the control of the number and the angle of emergent laser beams and the frequency difference of the emergent laser beam pair. The addressing unit receives and modulates the incident laser beam and outputs a preset number of emergent laser beams for addressing manipulation, wherein the emergent laser beam is one laser beam of the emergent laser beam pair for addressing manipulation. In the embodiment of the present disclosure, the incident laser beams are controlled to meet the Raman transition condition, and the frequency difference of the emergent laser beam pair keeps unchanged during addressing manipulation, which is helpful to achieve the quantum logic gate with high fidelity. The multi-dimensional addressing manipulation is achieved through the emergent laser beam pairs, which provides technical support for large-scale quantum computation.

Figure 8:
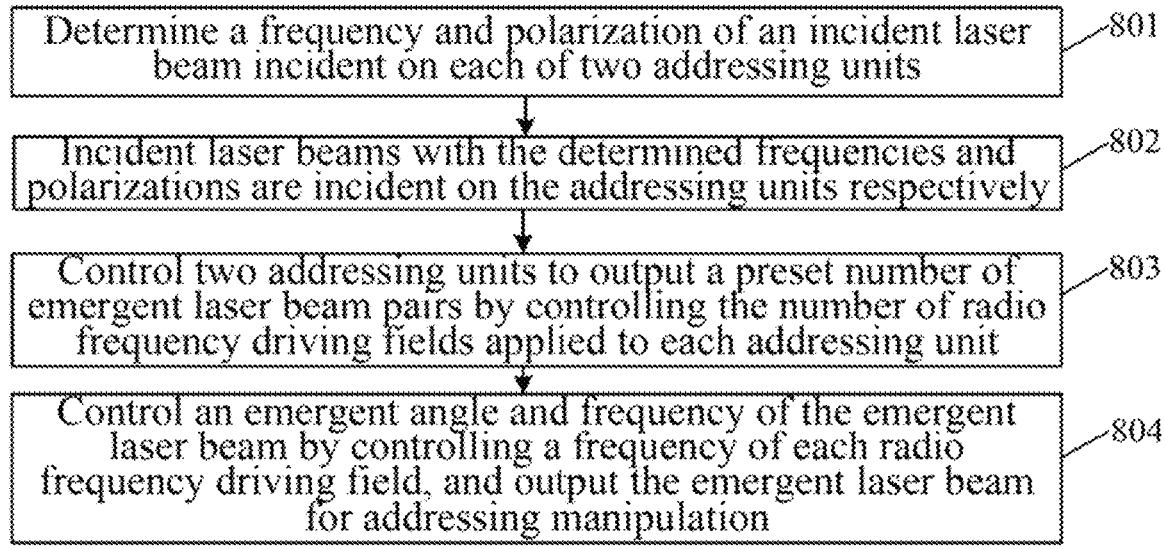
FIG. 8 is a flowchart of an addressing manipulation method according to an embodiment of the present disclosure.

FIG. 8 is a flow chart of an addressing manipulation method according to an embodiment of the present disclosure. As shown in FIG. 8, the method includes the following acts 801-804.

In act 801, a frequency and polarization of incident laser beam incident on each of two addressing units are determined, wherein the two addressing units are placed on two different sides of the qubits on which the addressing manipulation will be performed.

In act 802, the incident laser beams with the determined frequencies and polarizations are incident on two addressing units respectively, wherein the two incident laser beams incident on the two addressing units meet the Raman transition condition.

In act 803, the number of radio frequency driving fields applied to each of the two addressing unit is controlled, so that a preset number of emergent laser beam pairs for addressing manipulation are output by the two addressing units; wherein each emergent laser beam pair for addressing manipulation is directed to one qubit on which the addressing manipulation will be performed.

In act 804, an emergent angle and frequency of the emergent laser beam are controlled by controlling a frequency of each radio frequency driving field, and the emergent laser beam for addressing manipulation is output, wherein a frequency difference of the emergent laser beam pair for addressing manipulation keeps unchanged during the addressing manipulation.

In the embodiment of the present disclosure, the incident laser beams are controlled to meet the Raman transition condition, and the frequency difference of the emergent laser beam pair for addressing manipulation keeps unchanged during addressing manipulation, which ensures fidelity of the quantum logic gate. The multi-dimensional addressing manipulation is achieved through the emergent laser beam pairs, which provides technical support for large-scale quantum computation.

In an exemplary example, the addressing unit of the embodiment of the present disclosure includes one or more acousto-optic devices.

In an exemplary example, in the embodiment of the present disclosure, the controlling the number of radio frequency driving fields applied to each addressing unit includes: controlling the number of radio frequency driving fields applied to each acousto-optic device according to the preset number and the number and position distribution of the acousto-optic devices contained in each of the addressing units.

In an exemplary example, in the embodiment of the present disclosure, the controlling the frequency of each radio frequency driving field includes: determining a frequency of each applied radio frequency driving field according to predetermined spatial distribution of qubits on which the addressing manipulation will be performed and the number and position distribution of the acousto-optic devices contained in the each addressing unit; and the outputting the emergent laser beams for addressing manipulation includes: applying each radio frequency driving field with the determined frequency to a corresponding acousto-optic device to obtain the emergent laser beams for addressing manipulation.

In an exemplary example, the addressing manipulation method of the embodiment of the present disclosure further includes: focusing each emergent laser beam for addressing manipulation to a spot size only covering one qubit.

Hereinafter, the embodiments of the present disclosure will be briefly described through application examples, which are only used to illustrate the present disclosure, and are not used to limit the scope of protection of the present disclosure.

Application Example

This application example provides an addressing manipulation system, which is suitable for various types of ion (or atom) quantum computers. The addressing manipulation system can increase the channel capacity of addressing manipulation, improve addressing efficiency, achieve multi-dimensional (including one-dimensional, two-dimensional and three-dimensional) addressing manipulation of qubits, and promote the achievement of large-scale quantum computers.

Figure 9:
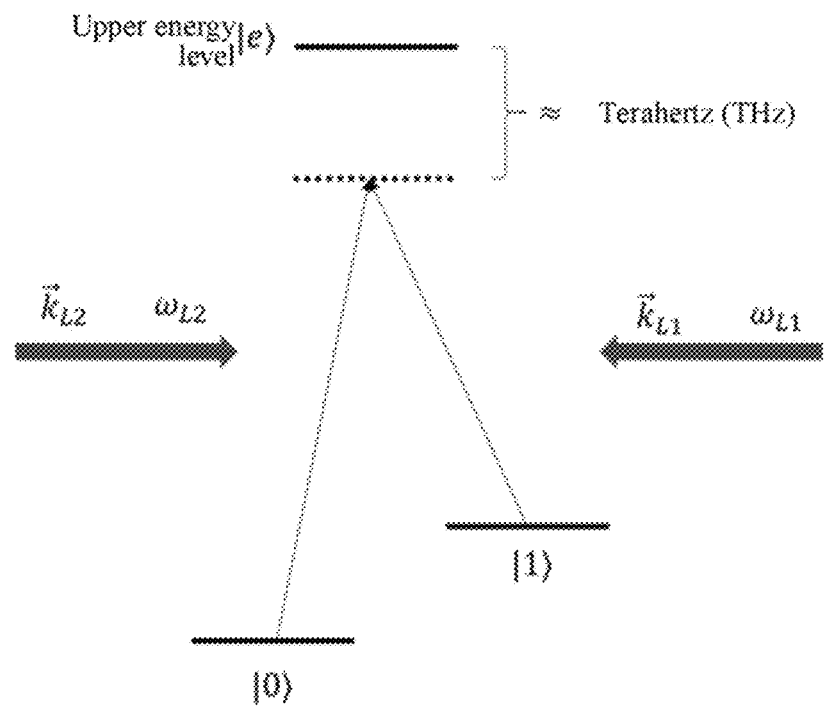
FIG. 9 is a schematic diagram of Raman transition.

In order to achieve multi-dimensional addressing manipulation of qubits, in this application example, when the incident laser beams are controlled to meet the Raman transition condition, and the frequency difference of the emergent laser beam pair keeps unchanged during addressing manipulation, the emergent laser beam pair for addressing manipulation will also meet the Raman transition condition. FIG. 9 is a schematic diagram of Raman transition. As shown in FIG. 9, two emergent laser beams are far detuned from an upper energy level $|e\rangle$, with a terahertz (THz, $10^{12}$ Hz) detuning, so the transition probability of $|0\rangle \leftrightarrow |e\rangle$ and $|1\rangle \leftrightarrow |e\rangle$ is extremely small. When the frequency difference between the two laser beams is exactly equal to the energy difference between $|0\rangle$ and $|1\rangle$ state, and the two laser beams are shined on one qubit simultaneously, the Raman transition of $|0\rangle \leftrightarrow |1\rangle$ can be achieved.

In this application example, the number of emergent laser beams is controlled by the number and spatial configuration of acousto-optic devices in the addressing unit and the number of radio frequency driving fields applied to each addressing unit. An emergent angle and frequency of the emergent laser beams are controlled by controlling the frequency of each radio frequency driving field. In this application example, the number of AODs contained in the addressing unit, directions and the number of incident laser beams, spatial configuration of AODs and the focusing module are set to make the emergent laser beams to meet the following requirements: the emergent laser beam pair for addressing manipulation intersects at the same qubit of a qubit array; the emergent laser beam pair for addressing manipulation meets the Raman transition condition, and their frequency difference keeps unchanged during the addressing manipulation.

Figure 10:
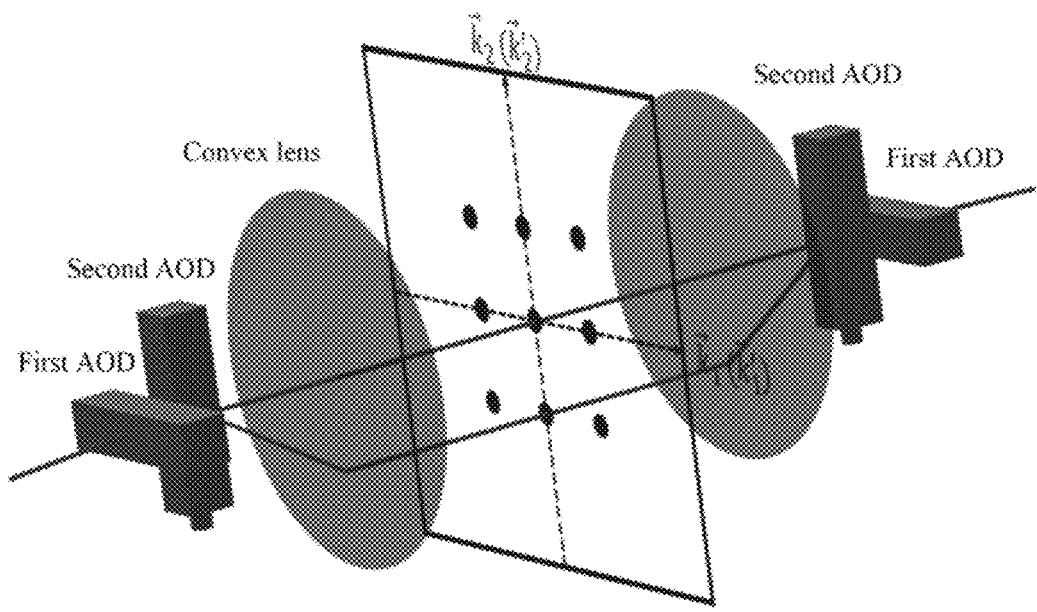
FIG. 10 is a schematic diagram of another addressing manipulation system according to an embodiment of the present disclosure.

The addressing manipulation system of this application example will be illustrated with the acousto-optic deflector (AOD) as acousto-optic device as below. FIG. 10 is a schematic diagram of an addressing manipulation system according to an embodiment of the present disclosure. As shown in FIG. 10, the addressing manipulation system includes two addressing units, each of which includes two AODs. Four AODs in the two addressing units are at the same height (the coordinates along the $\vec{K}_2$ axis are the same) and four AODs are at the same horizontal position (the coordinates along the $\vec{K}_1$ axis are the same). When emergent laser beams are controlled to meet the Raman transition condition, two-dimensional addressing manipulation of a qubit array may be achieved by the addressing manipulation system shown in FIG. 10.

In an exemplary example, this application example may set two addressing units to be placed with mirror symmetry about the plane of the qubit array. The AODs in the addressing unit are defined as a first AOD and a second AOD respectively according to the order of the incident laser beam passes through. A main axis of the first AOD in the addressing unit is along a row direction of the two-dimensional qubit array, and a main axis of the second AOD is along a column direction of the two-dimensional qubit array. In an exemplary example, the main axis of the AOD of this application example is the wave vector direction of the applied radio frequency driving field. In an exemplary example, two counter-propagated emergent laser beams are generated after the two incident laser beams passing through the two addressing units respectively, and the propagation direction of the emergent laser beams are perpendicular to the plane of the qubit array.

In an exemplary example, the frequencies and the number of radio frequency driving fields applied to the first AODs in two addressing units are the same, and the frequencies and the number of radio frequency driving fields applied to the second AODs in two addressing units are the same. The frequencies of the radio frequency driving fields applied to the first AOD and the second AOD may be different. The wave vectors $\vec{K}_1$ and $\vec{K}_1'$ of the radio frequency driving fields applied to the first AODs of the two addressing units respectively are the same. The wave vectors $\vec{K}_2$ and $\vec{K}_2'$ of the radio frequency driving fields applied to the second AODs of the two addressing units respectively are the same. In this application example an emergent laser beam pair for addressing manipulation has the same frequency shift when they intersect at any point on the plane of two-dimensional qubit array. In an exemplary example, the addressing unit of this application example includes a focusing module (such as a convex lens shown in the figure), the emergent laser beam is focused to a spot size only covering one qubit through the focusing module, thus achieve the spatial resolution of a single qubit. According to the embodiment of the present disclosure, after one incident laser beam passes through the addressing unit, the generated emergent laser beams with different deflected angle propagate in parallel, and a radial size of each output laser beam only covers a single qubit at the qubit array.

In an exemplary example, in this application example the emergent direction of emergent laser beam is determined according to the spatial locations of qubits; and the emergent laser beam may be controlled to propagate along a certain direction by controlling the frequency of the radio frequency driving field applied to the each addressing unit.

Figure 11:
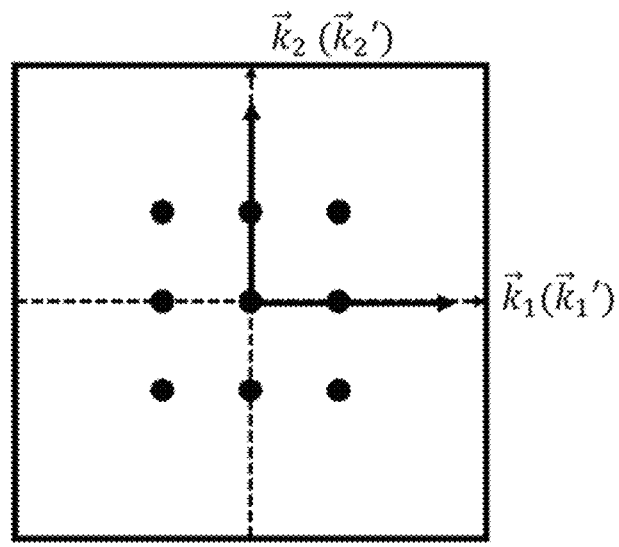
FIG. 11 is a schematic diagram of addressing manipulation according to an application example of the present disclosure.

FIG. 11 is a schematic diagram of addressing manipulation according to an application example of the present disclosure. As shown in FIG. 11, in this application example, when the addressing manipulation is performed for any qubits in the qubit array, an emergent laser beam pair meets the Raman transition condition and the frequency difference of the emergent laser beam pair keeps unchanged during addressing manipulation, which ensures high fidelity of the quantum logic gate.

Figure 12:
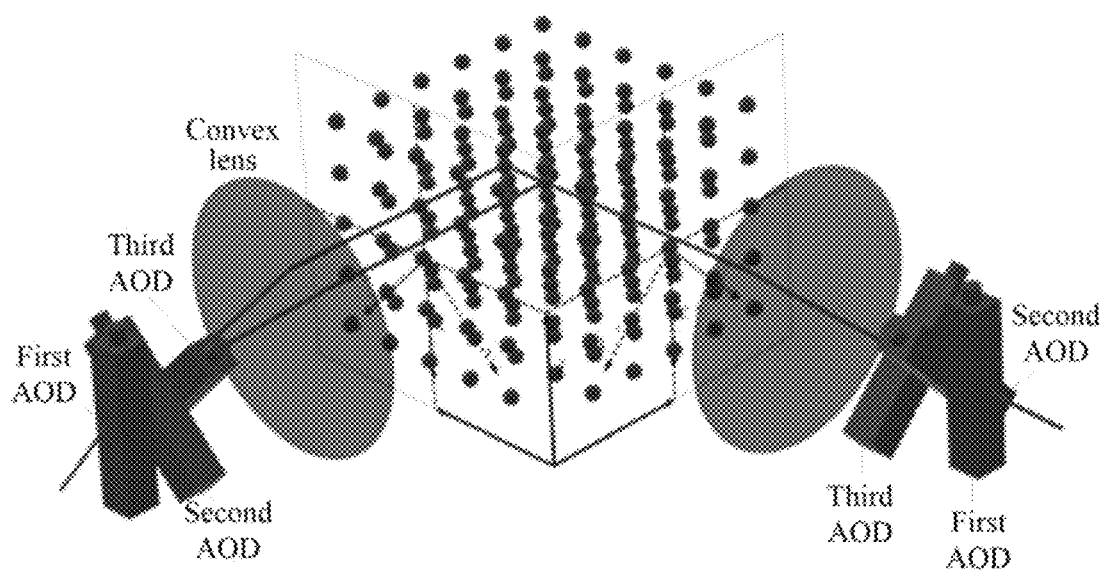
FIG. 12 is a schematic diagram of another addressing manipulation system according to an embodiment of the present disclosure.
Figure 13:
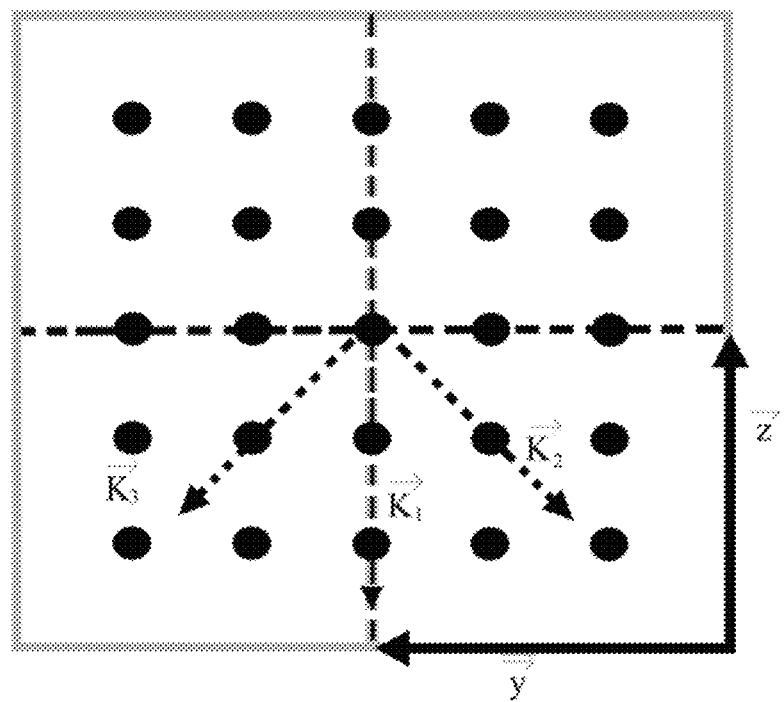
FIG. 13 is a schematic diagram of three-dimensional addressing manipulation according to an application example of the present disclosure.
Figure 14:
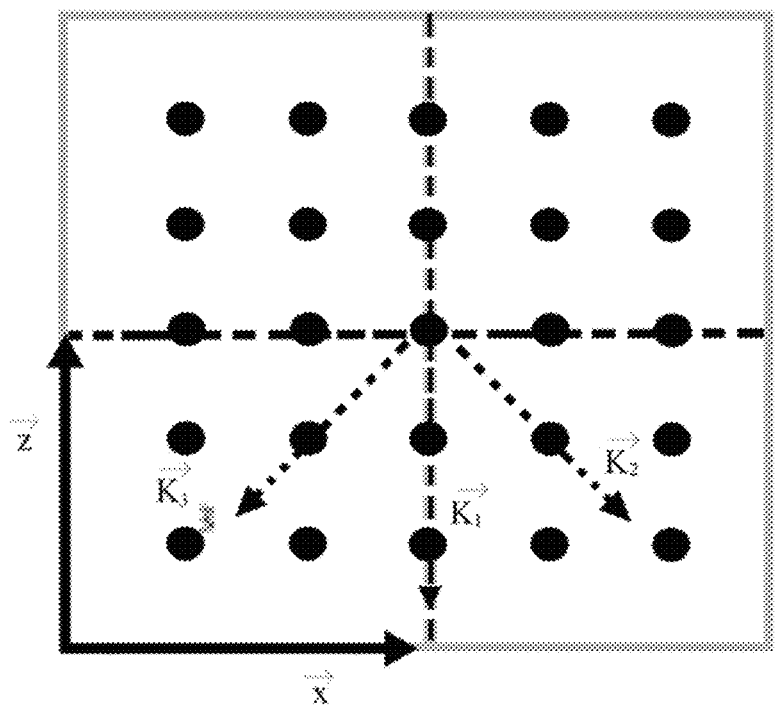
FIG. 14 is a schematic diagram of another three-dimensional addressing manipulation according to an application example of the present disclosure.

FIG. 12 is a schematic diagram of another addressing manipulation system according to an embodiment of the present disclosure. As shown in FIG. 12, the addressing manipulation system includes two addressing units, each addressing unit includes three AODs, and six AODs of the two addressing units are at the same height (the z coordinates are the same). Under the condition that the emergent laser beam pair meets the Raman transition condition, the two addressing units may output an emergent laser beam pair for performing addressing manipulation on qubits in a three-dimensional qubit army by controlling the frequency of the radio frequency driving field. The emergent laser beam pair intersect at the three-dimensional qubit array with a certain angle. In this application example, the frequency of the radio frequency driving field applied to each AOD may be determined according to spatial locations of qubits for addressing manipulation, and three-dimensional (including one-dimensional to three-dimensional) addressing manipulation of the qubits array may be achieved by controlling the frequency of applied radio frequency driving field. The AODs in the addressing unit are still defined as a first AOD, a second AOD and a third AOD according to the order of the incident laser beam passes through. In this application example, the scanning path of a first incident laser beam after passing through three AODs of the first addressing unit is as follows: the second AOD and the third AOD are responsible for scanning along the $\vec{y}$ direction; and the first AOD is responsible for scanning along a $\vec{z}$ direction. The scanning path of a second incident laser beam after passing through three AODs of the second addressing unit is as follows: the second AOD and the third AOD are responsible for scanning along the $\vec{x}$ direction; and the first AOD is responsible for scanning along the $\vec{z}$ direction. FIG. 13 and FIG. 14 are schematic diagrams of three-dimensional addressing manipulation according to an application example of the present disclosure. See FIG. 13 and FIG. 14, for qubits with the same coordinates in the $\vec{z}$ direction, two incident laser beams have the same frequency change after passing through three AODs respectively.

In an exemplary example, when the addressing manipulation system of this application example is used for addressing manipulation of the three-dimensional qubit array, three arrangement directions of the three-dimensional qubit array are defined as +x, +y and +z directions respectively, and two incident laser beams each passes through one addressing unit. Assumed that a line passing through the center of the qubit array and parallel to the Z axis is set as the reference axis, this application example may set the two addressing units to be placed with 90° rotational symmetry about the reference axis. The output laser beam, generated by the first incident laser beam passing through the addressing unit, propagates along the +x direction. The output laser beam, generated by the second incident laser beam passing through the addressing unit, propagates along the +y direction. A main axis of the first AOD of the first incident laser beam is along the −z direction, a main axis of the second AOD forms an angle of 135° with +z direction, and a main axis of the third AOD forms an angle of −135° with +Z direction.

In this application example, the frequency of Radio frequency driving field applied to the AOD is determined according to the spatial locations of qubits for addressing manipulation, which eliminates the requirement of equal spacing of ion qubits. Without changing hardware of the quantum computer, the addressing manipulation system helps to achieve the logic gate operation between arbitrary qubits, and to achieve quantum computation with different requirements.

In this application example, the positions of AODs and the incident direction of the incident laser beams are adjusted relative to the three-dimensional qubit array, which can ensure the two laser beams at each addressed position have the same frequency shift after passing through the addressing unit. In this application example, qubits do not need to be evenly distributed in space. The angle of the emergent laser beams incident on the qubit array may be adjusted by changing the frequency of the radio frequency driving field applied to the AOD addressing unit, so that scanning of an intersection point of two laser beams on the three-dimensional space can be achieved. In the process of quantum computation, if the qubit location is changed, real-time feedback adjustment may be applied according to the qubit location, so as to achieve more complex quantum algorithms and quantum error correction codes. Within a working bandwidth of the AOD, when radio frequency driving fields with multiple frequencies are applied at the same time, the AOD will generate multiple diffracted laser beams, so addressing manipulation on multiple qubits may be performed at the same time. Furthermore, the frequency and the number of the radio frequency driving fields applied to the AOD may be switched in real time, and the switching time is in microsecond order, so it has the ability of real-time adjusting and controlling the number and locations of the qubits to be addressed.

In this application example, the direction and the number of the incident laser beams, the number and spatial configuration of the AODs may be appropriately adjusted according to the actual application conditions, and the above adjustment should not be understood as a limitation to the embodiments of the present disclosure. In addition, the addressing ability of the addressing unit is related to parameters such as the working wavelength, working bandwidth, the effective diameter, the sound speed of the acousto-optic crystal. The acousto-optic deflector (AOD) used to implement the addressing manipulation system may be determined by the above parameters. In this application example, the angle between the incident laser beam and the AOD should strictly meet the angle requirement of Bragg diffraction. Other types of acousto-optic deflectors (AOD), specially designed acousto-optic deflectors (such as chirp AOD), some acousto-optic modulators (AOM) and other similar devices may also be used to implement the addressing manipulation system of this application example. Acousto-optic deflector is not the limiting condition to design and implement the addressing manipulation system of this application example.

Those of ordinary skill in the art may understand that all or some of the acts in the methods, functional modules/units in the systems and apparatuses disclosed above may be implemented as software, firmware, hardware and their appropriate combinations. In the hardware implementation, the division between functional modules/units mentioned in the above description does not necessarily correspond to the division of physical components. For example, a physical component may have multiple functions, or a function or act may be performed by several physical components in cooperation. Some or all of the components may be implemented as software executed by a processor, such as a digital signal processor or a microprocessor, or as hardware, or as an integrated circuit, such as an application specific integrated circuit. Such software may be distributed on computer-readable media, which may include computer storage media (or non-transitory media) and communication media (or transitory media). As is well known to those of ordinary skill in the art, the term "computer storage media" includes volatile and nonvolatile, removable and non-removable media implemented in any method or technology for storing information such as computer readable instructions, data structures, program modules or other data. Computer storage media include, but are not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other media that may be used to store desired information and may be accessed by a computer. Furthermore, it is well known to those of ordinary skill in the art that communication media usually contain computer-readable instructions, data structures, program modules or other data in modulated data signals such as carrier waves or other transmission mechanisms, and may include any information delivery media.

The invention claimed is:

1. An addressing manipulation system, comprising: two addressing units placed on two different sides of the qubits on which the addressing manipulation will be performed, a radio frequency driving unit and a control unit; wherein,
each of the addressing units is configured to receive an incident laser beam; modulate the incident laser beam according to a radio frequency driving field applied to the addressing unit and output a preset number of emergent laser beams for addressing manipulation; wherein, the corresponding emergent laser beams from the two addressing units form emergent laser beam pairs for addressing manipulation and each emergent laser beam pair for addressing manipulation is directed to one qubit on which the addressing manipulation will be performed;
the radio frequency driving unit is configured to control a number of radio frequency driving fields applied to each of the addressing units; control an emergent angle of the emergent laser beam by controlling a frequency of each applied radio frequency driving field, and control a frequency difference of the emergent laser beam pair for addressing manipulation, to keep the frequency difference of the emergent laser beam pair for addressing manipulation unchanged during the addressing manipulation; and
the control unit is configured to control a frequency and polarization of the incident laser beam incident on each of the addressing units in real time, to let the incident laser beams incident on the two addressing units meet the Raman transition condition on the qubit on which the addressing manipulation will be performed and let each emergent laser beam pair for addressing manipulation from the two addressing units meet the Raman transition condition on the qubit on which the addressing manipulation will be performed.

2. The addressing manipulation system according to claim 1, wherein the control unit is further configured to control an incident direction of the incident laser beam incident on each of the addressing units.

3. The addressing manipulation system according to claim 1, wherein each of the addressing units comprises one or more acousto-optic devices.

4. The addressing manipulation system according to claim 3, wherein that the radio frequency driving unit is configured to control the number of the radio frequency driving fields applied to each of the addressing units comprises:
the radio frequency driving unit is configured to control the number of radio frequency driving fields applied to each acousto-optic device according to the preset number and a number and position distribution of the acousto-optic devices comprised in each of the addressing units.

5. The addressing manipulation system according to claim 3, wherein that the radio frequency driving unit is configured to control the frequency of the each applied radio frequency driving field comprises:
the radio frequency driving unit is configured to control the frequency of the each applied radio frequency driving field according to predetermined spatial distribution of qubits on which the addressing manipulation will be performed and a number and position distribution of the acousto-optic devices comprised in the addressing unit.

6. The addressing manipulation system according to claim 1, wherein each of the addressing units further comprises a focusing module which is configured to:
focus each of the output emergent laser beams for addressing manipulation to a spot size only covering one qubit.

7. The addressing manipulation system according to claim 2, wherein each of the addressing units further comprises a focusing module which is configured to:
focus each of the output emergent laser beams for addressing manipulation to a spot size only covering one qubit.

8. The addressing manipulation system according to claim 1, wherein the addressing manipulation system is used for addressing manipulation of a two-dimensional qubit array.

9. The addressing manipulation system according to claim 8, wherein the two addressing units are placed with mirror symmetry about a plane of the qubit array.

10. The addressing manipulation system according to claim 1, wherein the addressing manipulation system is used for addressing manipulation of a three-dimensional qubit array.

11. The addressing manipulation system according to claim 10, wherein the two addressing units are placed with 90-degree rotational symmetry about a reference axis of the three-dimensional qubit array.

12. An addressing manipulation method, comprising:
determining a frequency and polarization of an incident laser beam incident on each of two addressing units; wherein the two addressing units are placed on two different sides of the qubits on which the addressing manipulation will be performed;
making incident laser beams with the determined frequencies and polarizations be incident on the two addressing units respectively;
controlling the two addressing units to output a preset number of emergent laser beam pairs for addressing manipulation by controlling a number of radio frequency driving fields applied to each of the two addressing units; wherein each emergent laser beam pair for addressing manipulation is directed to one qubit on which the addressing manipulation will be performed; and
controlling an emergent angle and frequency of an emergent laser beam by controlling a frequency of each radio frequency driving field, and outputting the emergent laser beam for addressing manipulation;
wherein the incident laser beams incident on the two addressing units meet the Raman transition condition on the qubit on which the addressing manipulation will be performed; each emergent laser beam pair for addressing manipulation from the two addressing units meet the Raman transition condition on the qubit on which the addressing manipulation will be performed; and a frequency difference of each emergent laser beam pair for addressing manipulation keeps unchanged during the addressing manipulation.

13. The addressing manipulation method according to claim 12, wherein the addressing unit comprises one or more acousto-optic devices.

14. The addressing manipulation method according to claim 13, wherein the controlling the number of radio frequency driving fields applied to each of the two addressing units comprises:
controlling the number of radio frequency driving fields applied to each acousto-optic device according to the preset number and a number and position distribution of the acousto-optic devices comprised in each of the two addressing units.

15. The addressing manipulation method according to claim 13, wherein the controlling the frequency of each radio frequency driving field comprises:
- determining a frequency of each applied radio frequency driving field according to predetermined spatial distribution of qubits on which the addressing manipulation will be performed and a number and position distribution of the acousto-optic devices comprised in the addressing unit; and
- the outputting the emergent laser beam for addressing manipulation comprises:
- applying each radio frequency driving field with the determined frequency to a corresponding acousto-optic device to obtain the emergent laser beam for addressing manipulation.

16. The addressing manipulation method according to claim 13, further comprising:
- focusing each of the emergent laser beams for addressing manipulation to a spot size only covering one qubit.

17. The addressing manipulation method according to claim 12, wherein the addressing manipulation method is for addressing manipulation of a two-dimensional qubit array.

18. The addressing manipulation method according to claim 17, wherein the two addressing units are placed with mirror symmetry about a plane of the qubit array.

19. The addressing manipulation method according to claim 12, wherein the addressing manipulation method is for addressing manipulation of a three-dimensional qubit array.

20. The addressing manipulation method according to claim 19, wherein the two addressing units are placed with 90-degree rotational symmetry about a reference axis of the three-dimensional qubit array.

* * * * *